United States Patent [19]

Fedkiw, Jr. et al.

[11] Patent Number: 5,223,102
[45] Date of Patent: Jun. 29, 1993

[54] PROCESS FOR THE ELECTROOXIDATION OF METHANOL TO FORMALDEHYDE AND METHYLAL

[75] Inventors: Peter S. Fedkiw, Jr., Raleigh; Raymond Liu, Cary, both of N.C.; James A. Trainham, III, Newark, Del.

[73] Assignee: E. I. Du Pont de Nemours and Company, Wilmington, Del.

[21] Appl. No.: 847,668

[22] Filed: Mar. 3, 1992

[51] Int. Cl.⁵ .............................................. C05B 3/02
[52] U.S. Cl. ...................... 204/78; 204/72; 204/59 R
[58] Field of Search .................... 204/78, 72, 59 R

[56] References Cited

U.S. PATENT DOCUMENTS

| | | | |
|---|---|---|---|
| 3,321,527 | 5/1967 | Punderson et al. | 260/603 |
| 4,347,109 | 8/1982 | Meshbesher | 204/78 |
| 4,457,809 | 7/1984 | Meshbesher | 204/59 R |
| 4,732,655 | 3/1988 | Morduchewitz et al. | 204/59 R |
| 4,959,152 | 9/1990 | Fedkiw, Jr. | 204/101 |
| 4,962,235 | 10/1990 | Morishita et al. | 568/493 |

FOREIGN PATENT DOCUMENTS 55-38934 of 1980 Japan.

OTHER PUBLICATIONS

Electrocatalytic Synthesis of Methyl Formate from Methanol on a Platinum-Bonded Solid Polymer Electrolyte Membrane, Otsuka et al., Feb. 3, 1986, 1986 Elsevier Science Publishers BV pp. 401-404.

Solid Polymer Electrolyte Water Electrolysis, Takenaka et al pp. 397-403.

Primary Examiner—John Niebling
Assistant Examiner—Kishor Mayekar
Attorney, Agent, or Firm—Paul R. Steyermark

[57] ABSTRACT

Formaldehyde and/or methylal are made by the electrooxidation of methanol in an apparatus which is divided into the anode compartment and the cathode compartment by a cationic membrane made of a fluoropolymer and having pendant fluorosulfonyl or sulfonic acid groups, which is coated on one side with platinum applied by the impregnation-reduction method, said coating serving as the anode. The cathode may be a metal layer on the opposite side of the membrane or a separate metal cathode. When the separate metal cathode is employed, the cathode compartment contains a liquid electrolyte, which is a concentrated inorganic acid, preferably phosphoric acid. Within specifically identified temperature ranges, the yield of formaldehyde and of methylal can be optimized by controlling the mole fraction or partial pressure of methanol feed.

9 Claims, 3 Drawing Sheets

PROCESS FOR THE ELECTROOXIDATION OF METHANOL TO FORMALDEHYDE AND METHYLAL

BACKGROUND OF THE INVENTION

This invention relates to a process for the electrooxidation of methanol to formaldehyde and methylal.

Formaldehyde is an important starting material for the production of certain polyacetal resins. It can be produced by the partial oxidation of methanol with air or oxygen in the presence of a variety of catalysts and under a variety of conditions. In some cases, methanol and formaldehyde formed in the process react further to give methylal, $CH_2(OCH_3)_2$; furthermore, formaldehyde often is in the same process oxidized in part to formic acid, which may again react with methanol to give methyl formate. Formation of methylal is not considered to be particularly detrimental to the production of formaldehyde because methylal can be readily hydrolyzed back to methanol and formaldehyde, as is well known in general for acetals and ketals. This catalytic process, in its various forms, is currently used to produce formaldehyde commercially. Nevertheless, it has the drawback of producing one mole of water for each mole of formaldehyde formed. This requires a rather complex and costly procedure for removing water from the formaldehyde produced. In addition, residual formaldehyde still present in the waste water must be removed before this water can be safely discharged.

Electrochemical oxidation of ethanol to acetaldehyde in a fuel cell arrangement is described in U.S. Pat. No. 4,457,809 (to Meshbesher).

Simultaneous electrochemical reduction of a mixture of benzene and methanol in the presence of tetrabutylammonium perchlorate to phenol in the cathode compartment and oxidation to methylal in the anode compartment in a cell equipped with an ionic transfer membrane is reported in U.S. Pat. No. 4,732,655 (to Morduchowitz et al.).

Electrocatalytic oxidation of methanol to methyl formate and methylal on a platinized solid polymer electrolyte membrane was reported by Otsuka et al. in *Applied Catalysis*, 26(1986) 401-404. The authors describe a process that occurs without either a solvent or a liquid electrolyte.

It is desirable to be able to produce formaldehyde and/or methylal in a selective manner and in an industrially satisfactory yield in a process that requires or produces a smaller amount of water than is produced in the conventional catalytic oxidation processes.

SUMMARY OF THE INVENTION

According to the present invention, there is now provided a process for the electrooxidation of methanol to a mixture of products comprising as the largest component a mixture of formaldehyde and methylal in a ratio that can be optimized with respect to either one, together with small amounts of methyl formate and any other products of oxidation or of side reactions, said process comprising:

(1) providing an electrolysis apparatus comprising a hydrated membrane made of a fluorocarbon resin having pendant sulfonic acid groups but no pendant carboxylic acid groups, said membrane having a platinum layer attached to at least one side thereof by impregnation of the membrane with a cationic salt of platinum and reduction with an anionic reducing agent, and being placed in the apparatus so as to divide the apparatus into two compartments, said platinum layer serving as the anode and the compartment which the anode is facing being the anode compartment, the opposite side of the membrane facing the cathode compartment, the cathode being a metal layer on the opposite side of the membrane when such layer is present but otherwise being a separate metal cathode located in the cathode compartment;

when a metal layer on the side of the membrane facing the cathode compartment is not present, and the separate metal electrode is not in direct contact with the membrane, the membrane being maintained wet with an electrolyte selected from the group consisting of aqueous solutions of at least 1M sulfuric acid and of at least about 85 weight percent phosphoric acid, said electrolyte also being in contact with the separate cathode;

(2) introducing a gaseous stream of methanol vapor plus any diluent gas continuously into the anode compartment at a pressure of about 101.3-1013 kPa and, when formaldehyde is the desired main product, at a temperature of about 75°-125° C., the mole fraction of methanol in the gaseous stream being about 0.005-0.02, and, when methylal is the desired main product, at a temperature of 25°-125° C., the mole fraction of methanol in the gaseous stream being about 0.02-1, while applying to the electrodes a voltage of about 0.6-1.2 V relative to a reference hydrogen electrode; and (3) recovering from the anode compartment the desired product mixture.

DETAILED DESCRIPTION OF THE INVENTION

Figure 1:
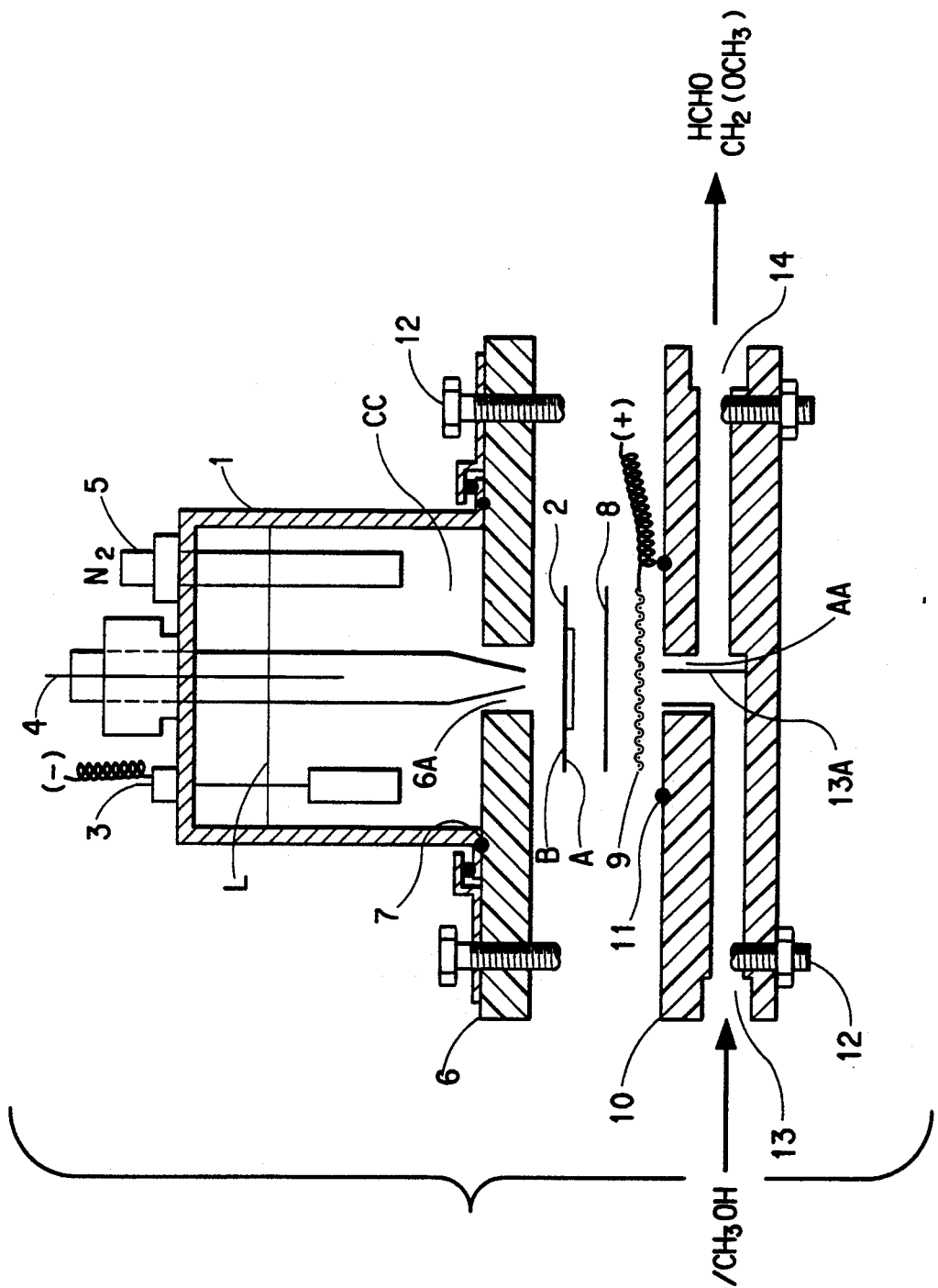
FIG. 1 is a schematic drawing of an electrolytic apparatus that can be used in the process of the present invention.

As shown by Otsuka et al., supra, the two-electron methanol oxidation process leading to formaldehyde and the four-electron reaction leading to formic acid can be represented by the following equations (1) and (2):

$$CH_3OH \rightarrow HCHO + 2H^+ + 2e^- \quad (1)$$

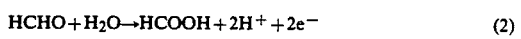

$$HCHO + H_2O \rightarrow HCOOH + 2H^+ + 2e^- \quad (2)$$

The protons formed at the anode are transported through the membrane into the cathode compartment, where they may combine to form molecular hydrogen, as shown in equation (3).

$$2H^+ + 2e^- \rightarrow H_2 \quad (3)$$

Formaldehyde and/or formic acid, which are generated electrochemically, may be in the acidic environment of the membrane react further with methanol to form either methylal or methyl formate. These are reversible reactions illustrated by equations (4) and (5), below:

$$HCHO + 2CH_3OH \rightleftharpoons CH_2(OCH_3)_2 + H_2O \quad (4)$$

$$HCOOH + CH_3OH \rightleftharpoons HCOOCH_3 + H_2O \quad (5)$$

The process conditions can be adjusted so as to obtain high selectivity of product formation. However, under the conditions of the present process, formation of methyl formate will be at most a minor side reaction.

According to the process of this invention, the anodic platinum coating is attached to the membrane by the impregnation-reduction method, sometimes referred to herein as the I-R method, which is described in U.S. Pat. No. 4,959,132 to Fedkiw. The I-R method is a two-step chemical process which produces a platinum deposit predominantly within the membrane and can be confined to within about 0.1 μm from the surface. The electroactive platinum is adjacent to the sulfonic acid sites on the membrane.

In the first step, the membrane surface is contacted for a controlled time (about 20–60 minutes) with a cationic salt solution of the metal to be deposited (e.g., Pt[(NH$_3$)$_4$]Cl$_2$). In the second step, which follows immediately the metal salt impregnation, the same membrane surface is exposed to an anionic reducing agent solution (e.g., aqueous, about 1 mM sodium borohydride at a pH of about 13). This treatment reduces Pt (II) to Pt(0).

The prior art also reports another process for the platinization of ionic membranes known as the diffusion-reduction method, described by Takenaka and Torikai in Japanese Patent 55/38934 (1980), sometimes referred to herein as the T—T method. It has been found, however, that membranes platinized by the T—T method are not well suited for the production of formaldehyde, although under proper conditions they can be satisfactorily used for the oxidation of methanol to methylal. Using a membrane platinized by the I-R method permits good process control to produce either formaldehyde or methylal with a good degree of selectivity.

While protons adsorbed on the cathode may combine to molecular hydrogen, which can be allowed to escape as such, this may not be a desirable alternative. It is energetically more attractive to electrochemically reduce oxygen with the protons at the cathode with formation of water, as shown in equation (6), below, $$O_2 + 4H^+ + 4e^- \rightarrow 2H_2O \quad (6).$$

Water formed in this reaction is separated from the product stream by the membrane barrier. While evaporative water loss from the hydrated membrane into the product stream will occur to some extent, the water content there is lower than would be the case if the entire water produced entered the product stream; consequently, water separation energy costs are lowered by comparison with conventional processes and waste generation is minimized. Alternatively, hydrogen produced in the cathode compartment can be used as a reactant in a parallel process, e.g., for the hydrogenation of an alkene to an alkane, as described by Fedkiw et al. in J. Electrochem. Soc., 137, 1451 (1990).

The process of the present invention, as can be seen, can be run within a rather broad range of gas pressures, from atmospheric to superatmospheric. The recited range is believed to be the most practical from the standpoint of economics, although it is not considered critical. In fact, these electrooxidation reactions would most likely be carried out in practice at atmospheric pressure (101.3 kPa). When these reactions are run at atmospheric pressure, the corresponding partial pressures of methanol will be 507–2026 Pa when formaldehyde is the desired main product and 2.03–101.3 kPa, when methylal is the desired main product. As can be seen, a diluent or carrier gas will always be employed when formaldehyde is the desired product but not necessarily when methylal is the desired product. In fact, in the latter case it may be preferred to operate without a diluent gas. When such gas is employed, it normally is helium, although another inert gas, e.g., argon or nitrogen, could be used instead.

An electrolysis apparatus that can be used in one embodiment of the process of this invention is schematically represented in FIG. 1. Here, the membrane side facing the cathode compartment does not carry a metal layer; a separate electrode not in contact with the membrane is used; and liquid electrolyte in the cathode compartment assures ion transport between the membrane and the separate electrode. In this drawing, 1 is the housing; 2 is the membrane, which has a platinized, anode-side A and a platinum-free side B; 3 is a platinum cathode. The apparatus is divided into the anode compartment AA and the cathode compartment CC. Hydrogen reference electrode 4 and nitrogen gas purging tube 5 are placed in the cathode compartment. The cathode compartment rests on a polytetrafluoroethylene plate, 6, from which it is sealed by means of an O-ring seal, 7. Catholyte (sulfuric or phosphoric acid) in the cathode compartment reaches level L. Opening 6A in plate 6 is closed by means of an assembly of membrane 2, carbon fiber cloth 8, and platinum wire gauze 9, with 8 and 9 serving as the anode current collector. This assembly is thus sandwiched between plate 6 and a second plate, 10, substantially parallel to plate 6 and is sealed from plate 10 by means of an O-ring seal 11. Although the drawing represents the membrane assembly parts as being separate from one another and separate from both plates, this representation is only for the purpose of better understanding of the construction of the apparatus; in fact, both plates and the assembly between them are held tightly together by means of adjustment bolts 12. Plate 10 has two holes drilled in it, 13, ending with a pipe 13A, which delivers to the anode compartment AA a stream of methanol vapor-carrying helium gas, and 14, through which the anodic reaction products are carried away. Methanol vapor impinges upon membrane 2, where the electrochemical oxidation of methanol takes place.

Formaldehyde, which is a gas boiling at atmospheric pressure at −19° C., can be separated from methylal, which is a liquid boiling at atmospheric pressure at about 42°–43° C., and recovered from the anodic gas stream in any convenient manner, including the distillation process employing a partial condenser described in U.S. Pat. No. 3,321,527 to Funderson et al. and the distillation process of U.S. Pat. No. 4,962,235 to Morishita et al., where crude formaldehyde is fed to the middle or lower section of a column, and a polyethylene oxide dimethyl ether is fed to the top of the column; formaldehyde is recovered overhead, and a solution containing polymethylene oxide dimethyl ether, water, and methanol is recovered from the bottom of the column. Under the conditions of the Morishita patent, a major portion of methylal is expected to be found in the liquid phase recovered from the bottom of the column. In the situation where the concentration of formaldehyde in the vapor phase exceeds approximately 60 weight percent, the Funderson et al. method is more practical. When the concentration of formaldehyde is less than about 60 weight percent, the Morishita process can be used to concentrate formaldehyde to at least 60 weight percent, and then the distillation is continued according to the Funderson et al. process.

The cathodic reaction products can be vented through an opening in the housing of the cathode compartment, e.g., the hole through which cathode 3 is inserted, or can be recovered through an exit tube, not shown.

It is to be kept in mind that other, equally good or better cell designs would also be suitable for use in the process of the present invention. For example, FIG. 1 shows the cathode as a separate metal electrode placed in the cathode compartment. This can be a rod, a wire, or a foil, and preferably is made of platinum when oxygen reduction is to take place at the cathode. However, the cathode could be made of another metal, for example, palladium, rhodium, or nickel. When it is proposed to allow molecular hydrogen to form at the cathode, platinum normally would not be recommended; a better cathode material in such a case would be nickel.

Figure 2:
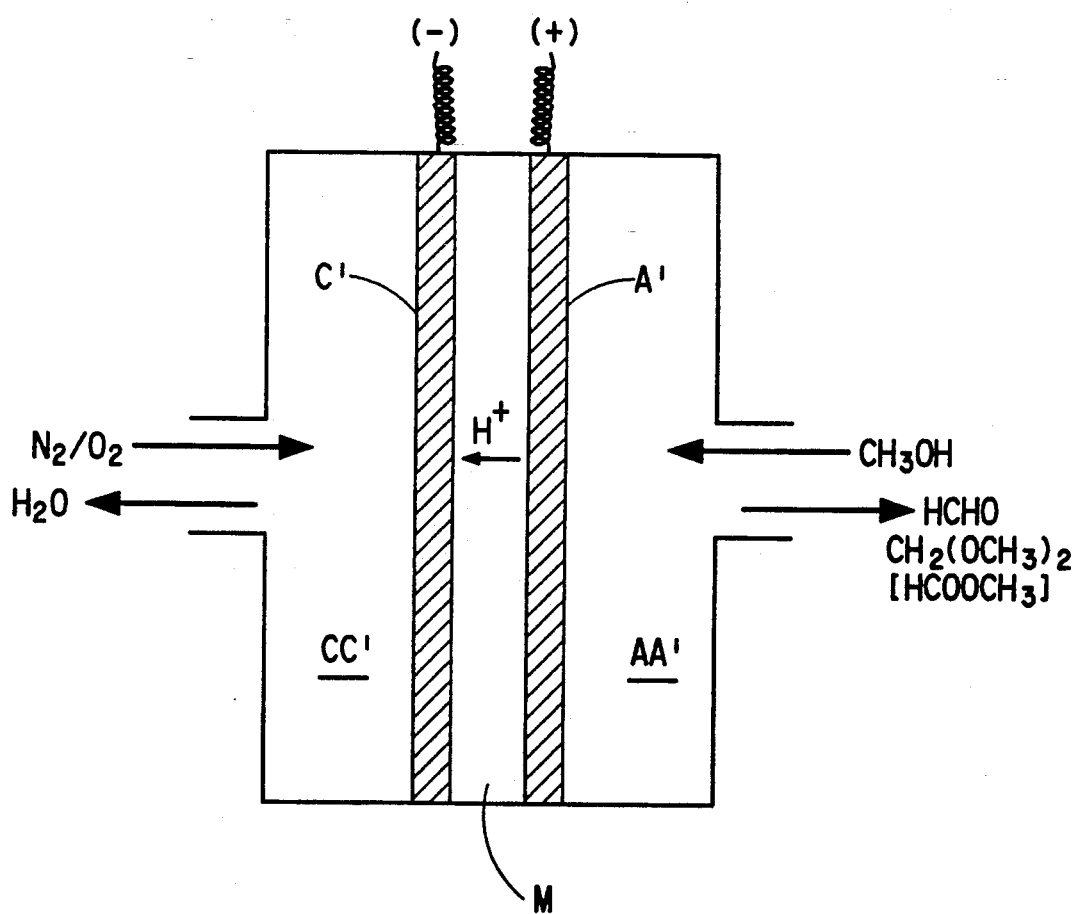
FIG. 2 is a schematic drawing of another type of electrolytic apparatus that can be used in the process of the present invention.

An alternative embodiment of an electrolytic apparatus suitable in the process of this invention is shown schematically in FIG. 2, where the cathode is a metal, preferably platinum, coating on the opposite side of the membrane from the anode coating. Such a second coating does not necessarily have to be made of platinum but may be made of a different metal, such as, e.g., palladium, rhodium, or nickel and does not have to be applied to the membrane by the same method as the anodic coating. In FIG. 2, M is a cationic membrane, which has a surface A' platinized by the above-described I-R method. Surface C" of the membrane is coated with any acceptable metal and by any suitable method. The T—T platinization method can be used here with good results. Further, the cathode can be a separate electrode in close contact with the membrane, for example, a wire gauze made of any one of the above-named metals, including nickel-plated copper or brass or, for that matter, of any conductive metal chemically stable in the cathode compartment environment or can even be a metallized plastic mesh. The anode compartment is designated AA' and the cathode compartment CC'. In this embodiment, no liquid electrolyte is needed in the cathode compartment. However, it may be desirable to saturate the membrane with acid electrolyte prior to use. Direct current is applied between both electrodes. Methanol vapor is introduced into the anode compartment, while humidified air is introduced into the cathode compartment. Hydrogen ions which are transported through the membrane are used to reduce oxygen on the cathode to water.

The membrane itself can be a commerical cationic membrane made of a fluoro-or perfluoropolymer, preferably a copolymer of two or more fluoro- or perfluoromonomers, at least one of which has pendant sulfonic acid groups. The presence of carboxylic groups is not desirable because those groups tend to decrease the conductivity of the membrane when they are protonated. Various suitable resin materials are available commerically or can be made according to patent literature. They include fluorinated polymers with side chains of the type $-CF_2CFRSO_3H$ and $-OCF_2CF_2CF_2SO_3H$, where R is a F, Cl, $CF_2Cl$, or a $C_1$ to $C_{10}$ perfluoroalkyl radical. The membrane resin may be, for example, a copolymer of tetrafluoroethylene with $CF_2=CFOCF_2CF(CF_3)OCF_2CF_2SO_3H$. Sometimes those resins may be in the form that has pendant $-SO_2F$ groups, rather than $-SO_3H$ groups. Such resins are easier to fabricate than those containing $-SO_3H$ groups. The sulfonyl fluoride groups can be hydrolyzed with potassium hydroxide to $-SO_3K$ groups, which then are exchanged with an acid to $-SO_3H$ groups. Suitable cationic membranes are offered by E. I. du Pont de Nemours and Company, Wilmington, Del., under the name NAFION ®. In particular, NAFION ® membranes containing pendant sulfonic acid groups include NAFION ® 117, NAFION ® 324, and NAFION ® 417. The first one is unsupported and has an equivalent weight of 1100 g, equivalent weight being defined as the amount of resin required to neutralize one liter of a 1M sodium hydroxide solution. The other two types are both supported on a fluorocarbon fabric, the equivalent weight of NAFION ® 417 also being 1100 g. NAFION ® 324 has a two-layer structure, a 125 μm thick membrane having an equivalent weight of 1100 g, and a 25 μm thick membrane having an equivalent weight of 1500 g. There also is offered a NAFION ® 117F grade, which is a precursor membrane having pendant $-SO_2F$ groups that can be converted to sulfonic acid groups. As is well known to those skilled in the art, a cationic membrane used in an electrooxidation reaction should be solvated or hydrated to assure sufficient conductivity. These resins are to some extent hygroscopic and the membranes are packed for shipping in a constant humidity environment. Further, the impregnation-reduction reaction, which is conducted in an aqueous medium, assures a sufficient level of hydration in the membrane, which can be, for example, 20 weight percent or higher.

The heterogeneous reaction shown by equation (1), above, takes place on the platinized membrane surface, which is the anode. The membrane also serves to transport H+ ions and to separate water which may be formed on the cathode from the formaldehyde formed on the anode. By the proper choice of reaction temperature, methanol feed partial pressure, cathode electrolyte water content, and electrical potential driving force, it is possible with this particular metallized membrane morphology to selectively control the distribution of the products formed. Specifically, the selective conversion of methanol to formaldehyde and methylal can be varied significantly by manipulation of those variables.

The process of the present invention illustrated in FIG. 1, which employs a separate metal cathode, requires a liquid electrolyte in the cathode compartment. For the purpose of the present invention, the most practical acid electrolyte is phosphoric acid having a concentration of about 85 weight % or higher, especially 85 weight %, which is readily available commercially. Another useful electrolyte is sulfuric acid, preferably having a 3 M (about 25 weight %) concentration or higher. Dilute aqueous acid solutions are not recommended, i.a., because a water-rich electrolyte favors the formation of methyl formate, rather than of formaldehyde or methylal. Besides, the more concentrated the acid is, the less water needs to be separated from the electrooxidation products.

The conditions employed for the electrooxidation of the present invention can be optimized for either desired main product as shown below. Thus, in a reaction run at atmospheric pressure, the conditions most favorable for the formation of formaldehyde are as follows:

temperature: 75°–125° C.
electrolyte: 85% phosphoric acid
mole fraction of methanol: 0.005–0.02
(partial pressure of methanol: 507–2026 Pa)
voltage: 0.9–1.1 V relative to hydrogen reference electrode, hereinafter sometimes abbreviated to RHE.
membrane anode Pt loading of about 0.05–0.50 mg Pt/cm$^2$.

For the formation at atmospheric pressure of methylal as the principal product, the preferred conditions are as follows:
temperature: 75°–125° C.
electrolyte: 85% phosphoric acid
mole fraction of methanol: 0.1–0.8
(partial pressure of methanol: 10.13–81.04 kPa)
voltage: 0.9–1.1 V RHE
membrane anode Pt loading of about 0.05–0.50 mg Pt/cm$^2$.

On the other hand, formation of methyl formate is favored by low temperature, for example, 0°–25° C.; a water-rich electrolyte, for example, 0.5M sulfuric acid; and a membrane platinized by the T—T technique, unlike the membrane platinized by the I-R method used in the present invention. Variants of that earlier process have been described in the art.

While the temperature and mole fraction or partial pressure of methanol are important parameters of the process of this invention, the morphology of the platinized membrane surface is also considered to be critical. The deposit must be within the membrane, so that the water content of the environment of the reaction site is lowered. In the case of a membrane platinized by the I-R method, this is the case, while with a membrane platinized by the T—T method the electrode is flooded with water.

The preferred apparatus is that illustrated in FIG. 2, where the cationic membrane carries a metal layer on the side opposite to the anode side. However, it is understood that neither the construction details of the apparatus nor the preferred process parameters are critical to a successful operation. For example, although operation at atmospheric pressure has been found to be most convenient in the laboratory, industrial operations may preferably be run at a superatmospheric pressure, which would permit a higher throughput and thus would result in a better utilization of equipment. Further, one skilled in the art would be able to devise a different apparatus capable of operating according to the above general principles or even occasionally go outside one of the indicated process parameters and still be able to make the desired electrooxidation products in a satisfactory manner. All such reasonable equivalents are intended to be within the scope of the present invention.

This invention is now illustrated by the following examples of certain preferred embodiments thereof, where all parts, proportions, and percentages are by weight, unless otherwise indicated. All experiments were run at atmospheric pressure.

Cell Assembly and Instrumentation

The cell assembly, shown in FIG. 1, consists of a cathode, (3), which often also is called the counterelectrode, and the anode, (A), or the working electrode. The cathode compartment (CC) was a glass reservoir capable of holding 120 ml of liquid electrolyte, and the anode compartment (AA) was a small cylindrical hole in a polytetrafluoroethylene plate with provision for gas inlet and outlet. The cathode (3) was a platinum foil connected to a platinum wire. The cathode compartment was filled with either 0.5M sulfuric acid or 85% phosphoric acid. The reference electrode (4) was a self-contained miniature hydrogen reference electrode made according to the procedure of Will described in *J. Electrochem Soc.*, 133, 454 (1986) filled with the same electrolyte. A platinized membrane, (2), made of a fluoropolymer having pendant —SO$_3$H groups (Du Pont Nafion ® 117) was placed so that the Pt surface was facing the incoming methanol vapor. Membrane platinization was obtained either by the I-R method or by the T—T method. The projected surface area of the electrode, i.e., the area defined by the opening in the polytetrafluoroethylene plate, was 0.78 cm$^2$.

Helium purged through liquid methanol at a rate of 10 ml/min so as to become saturated with methanol vapor served as the methanol feed. The partial pressure of feed methanol was controlled by controlling the temperature of the helium purge. Methanol partial pressures were 533, 1067, 2133, 4000, 12932, and 54662 Pa, while the total gas pressure in the electrolytic cell was 101.3 kPa. The electrooxidation temperature was controlled at 25°, 50°, 75°, and 100° C. by placing the electrolytic cell in an electric oven.

The electrolytic cell exit gas was analyzed by gas chromatography in a Perkin-Elmer instrument equipped with a thermal conductivity detector.

EXAMPLE 1

Repeated runs at different temperatures and partial pressures of methanol showed that best formaldehyde selectivity was obtained at a temperature of 100° C., with a membrane platinized by the I-R technique, at either 533 or 1067 Pa, but at the lower partial pressure the limiting current was lower. The overall best reaction conditions with best selectivity were: membrane anode platinized by the I-R technique, a temperature of 100° C., methanol partial pressure of 1067 Pa, and 85% phosphoric acid electrolyte. Under those conditions, the selectivity of formaldehyde formation was about 75 mole % at a current density of 5 mA/cm$^2$ (998 mV RHE), and the rate of formaldehyde formation was 0.65 $\mu$mole/min/cm$^2$.

By contrast, a membrane platinized by the T—T method, reaction temperature of 25° C., and a high water content environment favored the formation of a four-electron oxidation product, methyl formate, rather than of a two-electron oxidation product, formaldehyde or methylal. Further, under these conditions, high partial pressure of methanol favored the formation of methylal over that of formaldehyde.

Thus, at a temperature of 25° C. and methanol partial pressure of 12932 Pa, with 0.5M sulfuric acid electrolyte, the selectivity of formaldehyde formation with a T—T platinized membrane was about 5% at a current density of 10 mA/cm$^2$ (996 mV RHE), and the rate of formaldehyde formation was 0.08 $\mu$mole/min/cm$^2$.

EXAMPLE 2

Methylal formation was favored by the use of a membrane platinized by the I-R method, with high temperature, high partial pressure of methanol, and low water content environment. The best conditions were observed at: temperature of 100° C., partial pressure of methanol of 54662 Pa, and 85% phosphoric acid electrolyte. The selectivity of methylal formation under these conditions was 80 mole % at a current density of 25 mA/cm$^2$ (1.052 V RHE), and the rate of methylal formation was 3.9 μmole/min/cm$^2$.

Again, by contrast, when a T—T platinized membrane was used, and the experiments were run at room temperature and in a high water content environment, methylal formation selectivity was low, due to the tendency of forming a four-electron oxidation product. Thus, when the partial pressure of methanol was lowered to 12932 Pa, and the reaction was run at 25° C., using 0.5M sulfuric acid as the electrolyte, the methylal formation selectivity was about 15 mole % at a current density of 10 mA/cm$^2$ (996 mV RHE), and the methylal formation rate was 0.18 μmole/min/cm$^2$.

EXAMPLE 3

Comparative

It also was found that methyl formate formation is favored by the use of a membrane platinized by the T—T method, low reaction temperature, high partial pressure of methanol, and high water content electrolyte. At 25° C., methanol partial pressure of 12932 Pa, and 0.5M sulfuric acid electrolyte, the selectivity of methyl formate formation was about 75 mole % at a current density of 15 mA/cm$^2$ (1275 mV RHE), and its rate of formation was 1.6 μmole/min/cm$^2$.

Figure 3:
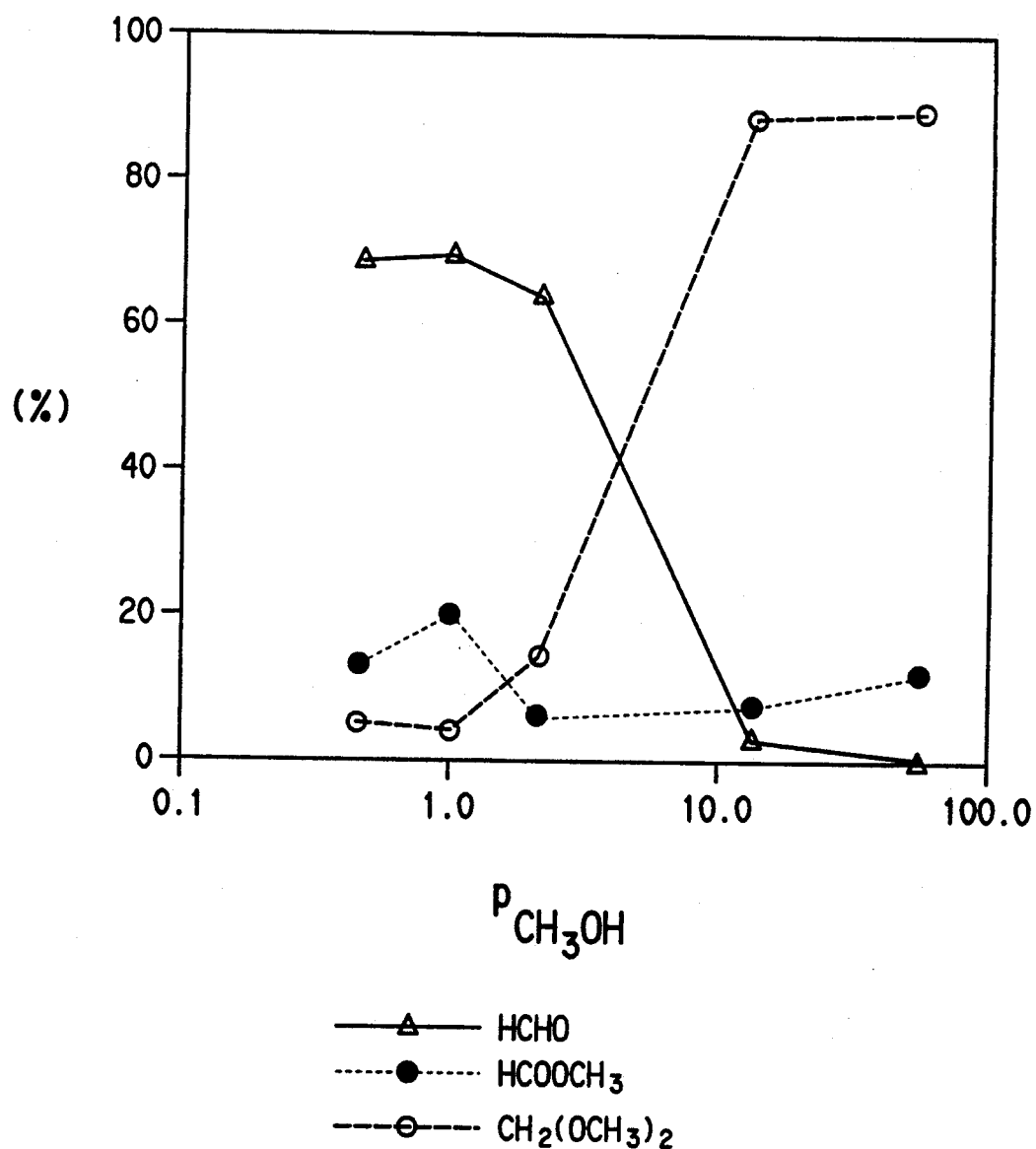
FIG. 3 is a plot of product distribution (%) vs. partial pressure of methanol, $p_{CH_3OH}$, (kPa) in electrooxidations carried out at atmospheric pressure.

FIG. 3 is a semilogarithmic plot of product distribution, in a reaction run at atmospheric pressure, as mole percent of the total of formaldehyde, methylal, and methyl formate, as a function of partial pressure of methanol feed under the following conditions:
membrane platinized by the I-R method;
current density=4 mA/cm$^2$;
temperature=100° C.
catholyte: 85% phosphoric acid.

It can be very well seen from this graph that under these conditions, the formation of either formaldehyde or methylal can be optimized by adjusting the partial pressure of methanol feed while at the same time minimizing the formation of methyl formate. The graph suggests that although the optimum methanol feed pressure for making formaldehyde lies at this temperature within the range of about 0.5-2 kPa, operation within the range of about 0.5-1.3 kPa produces a fair amount of methyl formate, while within the range of about 1.3-2 kPa, it produces less methyl formate but increasing amounts of methylal. From the practical standpoint, it is believed that operation with the methanol feed pressure within the range of about 1.3-2 kPa is the most practical because the yield of methyl formate is at its minimum, while the yield of formaldehyde is near its optimum, the material throughput being at the upper end of the operable range.

We claim:

1. Process for the electrooxidation of methanol to a mixture of products comprising as the largest component a mixture of formaldehyde and methylal in a ratio that can be optimized with respect to either one, together with small amounts of methyl formate and any other products of oxidation or of side reactions, said process comprising:

(1) providing an electrolysis apparatus comprising a hydrated membrane made of a fluorocarbon resin having pendant sulfonic acid groups but no pendant carboxylic acid groups, said membrane having a platinum layer attached to at least one side thereof by impregnation of the membrane with a cationic salt of platinum and reduction with an anionic reducing agent, and being placed in the apparatus so as to divide the apparatus into two compartments, said platinum layer serving as the anode and the compartment which the anode is facing being the anode compartment, the opposite side of the membrane facing the cathode compartment, the cathode being a metal layer on the opposite side of the membrane when such layer is present but otherwise being a separate metal cathode located in the cathode compartment;

when a metal layer on the side of the membrane facing the cathode compartment is not present, and the separate metal electrode is not in direct contact with the membrane, the membrane being maintained wet with an electrolyte selected from the group consisting of aqueous solutions of at least 1M sulfuric acid and of at least about 85 weight percent phosphoric acid, said electrolyte also being in contact with the separate cathode;

(2) introducing a gaseous stream of methanol vapor plus any diluent gas continuously into the anode compartment at a pressure of about 101.3-1013 kPa and, when formaldehyde is the desired main product, at a temperature of about 75°-125° C., the mole fraction of methanol in the gaseous stream being about 0.005-0.02, and, when methylal is the desired main product, at a temperature of 25°-125° C., the mole fraction of methanol in the gaseous stream being about 0.02-1, while applying to the electrodes a voltage of about 0.6-1.2 V relative to a reference hydrogen electrode; and (3) recovering from the anode compartment the desired product mixture.

2. The process of claim 1 wherein the membrane carries a metal layer on each side, the metallized surface of the membrane opposite the side carrying a platinum coating applied by the impregnation and reduction method being the cathode.

3. The process of claim 2 wherein the cathode metal is platinum, rhodium, or nickel.

4. The process of claim 3 wherein the membrane is saturated with liquid acid electrolyte.

5. The process of claim 4 wherein the electrolyte is concentrated phosphoric acid.

6. The process of claim 1 wherein the electrolyte, when used, is about 85 weight percent phosphoric acid; and the voltage applied between the anode and the cathode is 0.9-1.1 V relative to hydrogen reference electrode.

7. The process of claim 1, run at atmospheric pressure, wherein the partial pressure of methanol feed is about 507-2026 Pa, and the voltage applied between the anode and the cathode is 0.9-1.1 V relative to hydrogen reference electrode, whereby the principal electrooxidation product is formaldehyde.

8. The process of claim 7 wherein the partial pressure of methanol feed is about 1.3-2 kPa.

9. The process of claim 1, run at atmospheric pressure and at a temperature of 75°-125° C. wherein the partial pressure of methanol feed is about 10.13-81.04 kPa, and the voltage applied between the anode and the cathode is 0.9-1.1 V relative to hydrogen reference electrode, whereby the principal electrooxidation product is methylal.

* * * * *